United States Patent [19]

Masters

[11] 4,010,666
[45] Mar. 8, 1977

[54] PERFORATING BLADE

[76] Inventor: Christopher F. Masters, 2525 S. Shore Drive, Milwaukee, Wis. 53207

[22] Filed: Jan. 9, 1976

[21] Appl. No.: 647,835

Related U.S. Application Data

[60] Division of Ser. No. 512,839, Oct. 4, 1974, Pat. No. 3,973,452, which is a continuation-in-part of Ser. No. 317,838, Dec. 22, 1972, abandoned.

[52] U.S. Cl. .................................. 83/678; 83/349; 83/674
[51] Int. Cl.² .......................................... B26D 1/38
[58] Field of Search ..................... 83/349, 674, 678

[56] References Cited

UNITED STATES PATENTS

| 2,870,840 | 1/1959 | Kwitek | 83/678 X |
| 3,264,921 | 8/1966 | Nystrand | 83/349 X |
| 3,716,132 | 2/1973 | Lewyckyj | 83/678 X |

*Primary Examiner*—Frank T. Yost
*Attorney, Agent, or Firm*—Henry C. Fuller

[57] ABSTRACT

Perforating blades for perforating traveling webs of material such as paper in high speed apparatus are made from cold rolled steel which is hardened in a vacuum furnace to produce a scale free surface. The height to which the blades are ground is determined by measuring the average thickness of the blade and grinding the height of the blade to a dimension and tolerance in accordance with an equation which relates blade height to blade thickness. Thus the thickness of each blade can vary. With conventional knife rolls in which the blades form an angle of 45° relative to a radial line of the knife roll, the sum of the height and thickness for each blade in the knife roll is equal.

4 Claims, 6 Drawing Figures

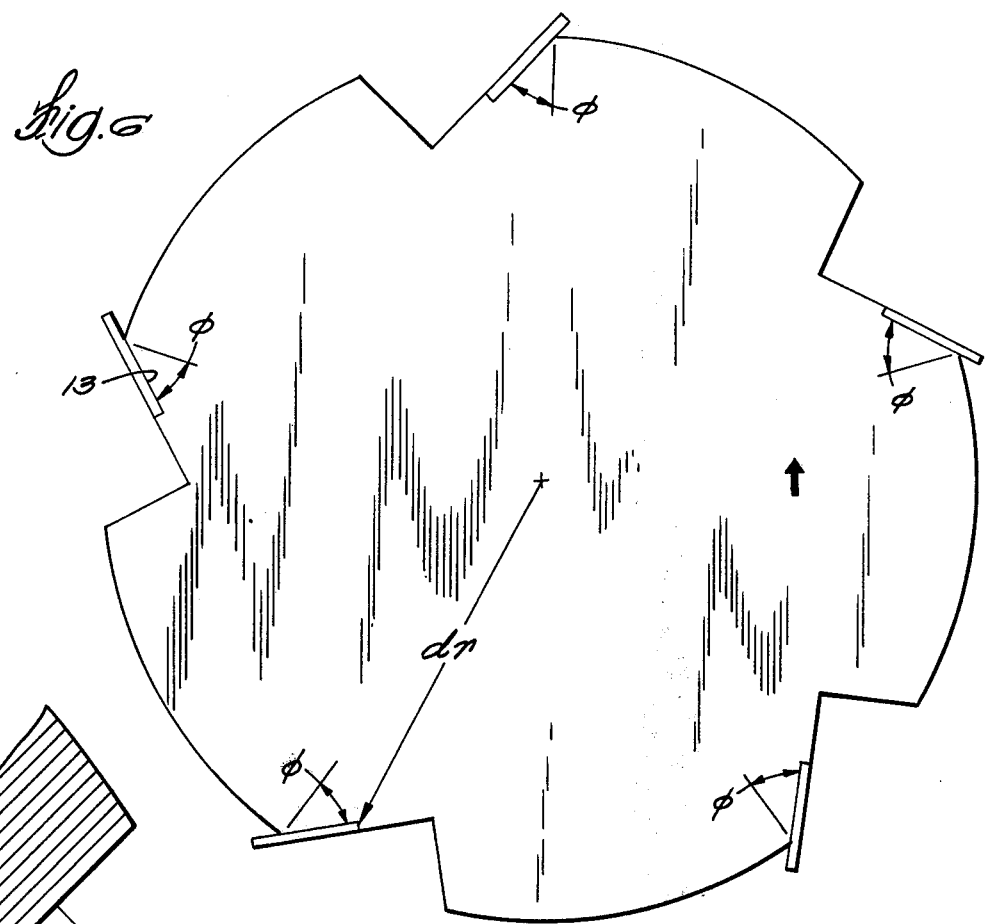
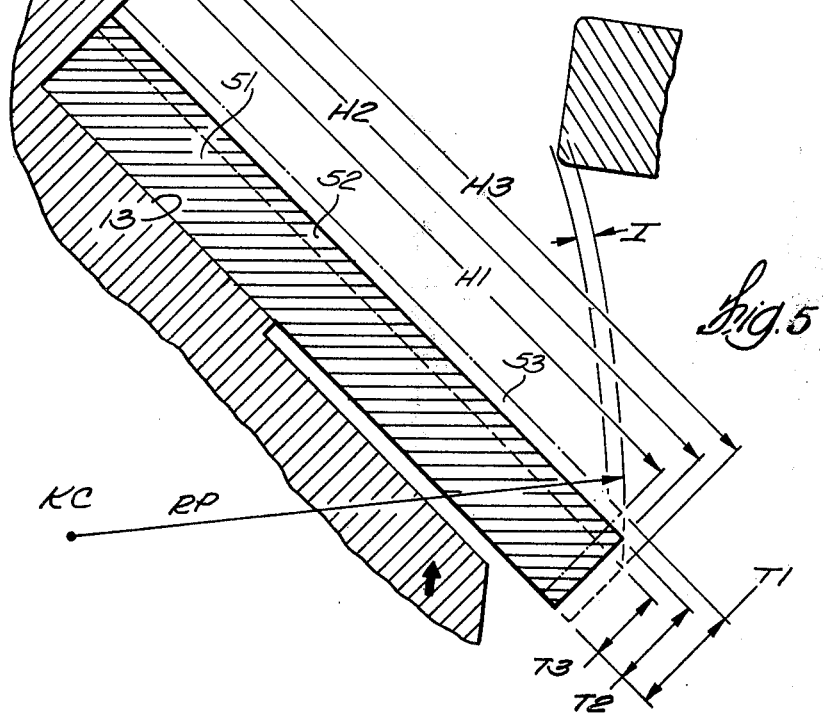

PERFORATING BLADE

CROSS REFERENCE TO RELATED APPLICATION

This appliation is a divisional application of Ser. No. 512,839 filed Oct. 4, 1974, now U.S. Pat. No. 3,975,452. U.S. Pat. No. 3,973,452 is a continuation-in-part application of Ser. No. 317,838 filed Dec. 22, 1972, and now abandoned.

BACKGROUND OF INVENTION

The invention relates to perforating blades used in high speed web cutting apparatus for the transverse perforating of a web such as the apparatus described in U.S. Pat. No. 2,870,840. Prior art perforating blades such as those disclosed in U.S. Pat. No. 3,190,163 are constructed of standard sheet steel stock, and the blades are ground to certain thicknesses and heights within specified tolerances to provide the desired blade extension. The grinding of the thickness of large flat surfaces of the blades to meet the customer's specifications and tolerances results in considerable expense in manufacturing the blades. The blades are typically ground to one of three thicknesses: 0.032"; 0.040"; and 0.047". The following blade heights are in common usage within the industry: 0.875"; 0.906"; 0.925"; and 1.000". Operators of this perforating apparatus standardize on a height for their particular equipment (for instance 0.875) and then vary the thickness between the three commonly available sizes according to the individual preference of the operator of this perforating apparatus.

SUMMARY OF INVENTION

The invention provides a new perforating blade and a method of making the blade in which surface grinding of the large flat surfaces is not required. The invention recognizes the relationship between height and thickness of the blade, both of which contribute to the total blade extension of the perforating blades from the knife roll towards the cooperating anvil. This is because the perforating blades are inclined with respect to a radial line drawn from their farthest radial extension to the knife roll center.

In practice of the method, hardened cold rolled high speed steel is used for the blade blanks. The blades are hardened in a vacuum furnace to produce a scale free surface. After the blades are hardened, the average thickness of the blade is measured over the surface. The blade height is then ground to a height and with a tolerance according to an equation which relates blade height to blade thickness.

Inasmuch as the blade is not surface ground on the large flat sides, the steel can be purchased in a thinner gauge than the steel used to make blades according to the prior art process. In addition, the blade sides of blades made in accordance with the invention have a much smoother finish of for instance six microinches RMS and therefore are much less likely to break when stressed, because there are minimal surface cracks for stress concentrations to develop. The elimination of surface grinding substantially reduces the cost of the blades. In addition, blades made in accordance with the invention should have a longer life because less surface stresses are induced on the blade cutting edge by the elimination of grinding one of the two surfaces which makes up the cutting surface.

With conventional knife rolls as shown in the aforementioned patents, the blades form an angle of 45° with a radial line from the knife roll center. This simplifies the equation, relating height to width, and the sum of the height and width for each blade in the knife roll will be approximately equal, although the thickness and height of each blade may vary considerably. However, the projection of all blades from the knife roll will be substantially equal.

Further objects, advantages and features of the invention will become apparent from the following disclosure.

DRAWINGS

FIG. 5 is a fragmentary and diagrammatic enlarged view of a knife roll with three perforating blades of different thicknesses mounted in the same slot.

FIG. 6 is an enlarged diagrammatic end view of a knife roll and perforating blades.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

For purposes of exemplification, one type of paper perforating blade is shown and described in a specific type of perforating apparatus. Other types of perforating blades with different sizes than described herein are within the purview of the invention.

Figure 1:
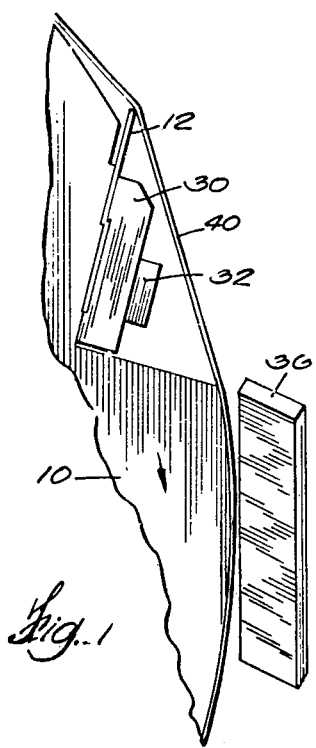
FIG. 1 is a fragmentary diagrammatic end view of a knife roll, perforating blade and cooperating anvil in web perforating apparatus.
Figure 2:
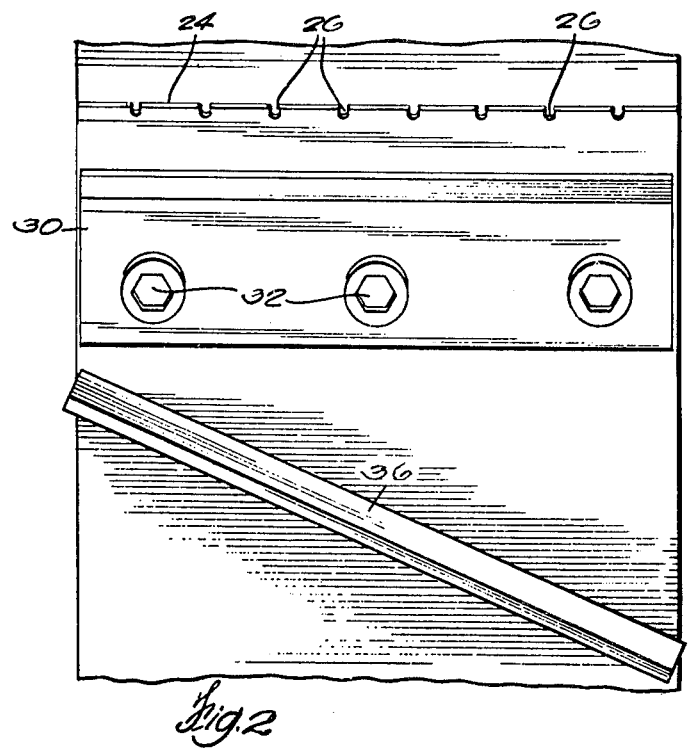
FIG. 2 is a side view of the parts shown in FIG. 1.
Figure 3:
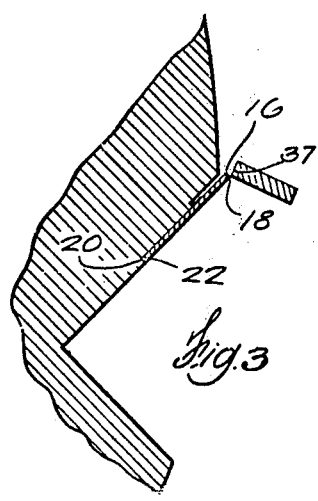
FIG. 3 is a diagrammatic sectional view showing engagement of the perforating blade and the anvil.

In the drawings, FIGS. 1 and 6 show a knife roll 10 on which a plurality of perforating blades 12 are installed. The knife roll is typically 12 inches in diameter and eight feet long. The perforating blades 12 are about 4½ inches long by one inch high and 1/32 inch thick. The blades 12 have four cutting edges 16, 18, 20 and 22. The cutting edges are in the form of a series of lands 24 separated by notches or gaps 26.

In FIG. 6, an end view of the complete knife roll 10 is illustrated. This knife roll has five perforating blades 12 arranged around the periphery. Each blade is sitting in a recess 13 machined in the knife roll, each recess of which is so machined that the distance dr from the bottom of the recess to the center of the knife roll is the same, and that the angle $\phi$ which the side of the recess makes with a line perpendicular to the knife roll face is the same for all recesses.

The perforating blades 12 are secured to the knife roll 10 by clamps 30 and clamp bolts 32. The perforating blade cooperates with an anvil 36 which is diagrammatically shown in the drawings without an anvil clamp. The anvil 36 does not move during machine operation. The paper web 40 is arranged around the knife roll 10 and the knife roll rotates at the same surface speed as the web 40. There is no relative motion between the web and the knife roll surface.

Perforations in the web 40 are effected when the rotating perforating blade 12 with the web 40 arranged over the blade comes in contact with the anvil 36. The perforating blade 12 projects a sufficient distance from the knife roll 10 so that it strikes the edge 37 of the anvil 36. For the perforating blade 12 to rotate past the anvil 36, the blade 12 must bend, which it is designed to do, without breaking. FIG. 5 illustrates the interference I. During the bending operation, the blade 12 exerts enough pressure on the web squeezed between it and the anvil 36 that a cut, or perforation is effected. As thus far described, the apparatus is conventional perforating apparatus.

The perforating blades of the invention are made from cold-rolled, annealed, high speed steel. This material can be manufactured with a total thickness variation, in the range of 0.032 inches to 0.050 inches, of typically 0.004 inches. Furthermore, over an area of 1 inch high by 4½ inches long, the steel sides will be parallel to within 0.001 inch.

The material for the perforating blades of the invention is obtained in the fully annealed form, and in blanks slightly oversized on the length and height dimensions. The thickness of the blanks as obtained is as close to finished thickness as can be rolled by the steel mill. Note that even though the thickness from blade to blade may vary as much as 0.004 inch in a given lot, within any given blade the thickness will vary by no more than 0.001 inch. This is a direct result of the parallelity requirement discussed above.

The blade blanks are hardened in a vacuum furnace. Because this steel is "cold-rolled" to produce the finished "as-rolled" thickness, no decarburization is produced on the steel surface of the mill. As a result, the steel can be hardened without first removing any decarburized surface, as is necessary in steel finished by "hot-rolling" techniques. Furthermore, since the hardening operation is performed in a vacuum, no scale develops on the surface. The material, therefore, does not have to be ground on the thickness dimension, if the purpose of such grinding is solely to remove heat-treating scale. Although a major advantage of the invention is to eliminate or reduce surface grinding, some of the further advantages of the invention can be obtained if the height is ground as subsequently described after some surface grinding.

The typical $\Delta t_d$ variation in the blade thickness as hardened is 0.004 inch, which if combined with a typical $\Delta h_d$ variation of height of 0.001 inch, would lead to large variations in the radial extension of the blade from the knife roll. Variations of this type are unacceptable to most practitioners of the art of operating perforating machinery.

Figure 4:
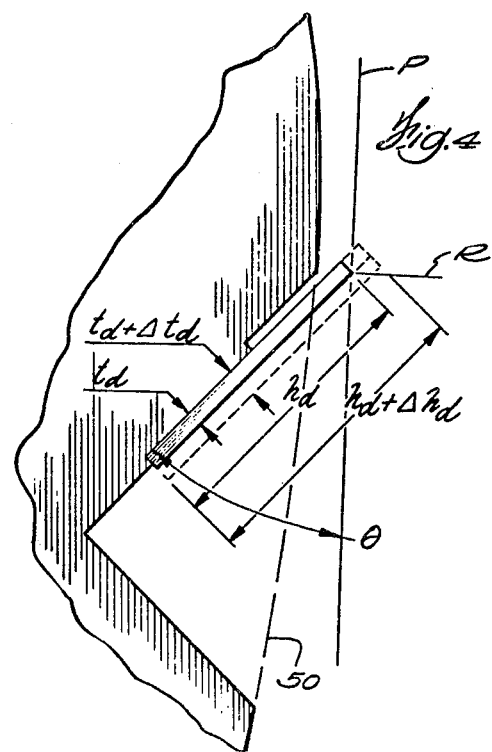
FIG. 4 is an enlarged view of the perforating blade shown in FIG. 3.

I have discovered the relationship of thickness and height with respect to total blade extension. FIG. 4 shows how both the thickness $t_d$ and height $h_d$ effect the projection of the blade 12 toward the anvil. Prior to grinding the height of a blade, I measure the thickness of each blade in several places and grind its height h to a value given by the following equation:

$$h = (h_d + \Delta h_d/2) + (t_d + \Delta t_d/2) \cot \theta - \bar{t} \cot \theta ;$$

and in which:

$t_d$ = the minimum predetermined thickness of a blade, $t_d + \Delta t_d$ = the maximum predetermined thickness of a blade, $\Delta t_d$ = the maximum predetermined thickness variation, $h_d$ = the minimum predetermined height, $h_d + \Delta h_d$ = the maximum predetermined height, $\Delta h_d$ = the maximum predetermined height variation.

$\theta$ = the angle the blade height side makes with a plane P perpendicular to the radial line R from the farthest radial extension of the blade to the center of the knife roll, when the blade is at its minimum predetermined height and thickness, $\bar{t}$ = the average thickness of the blade as measured, and in which the variation in thickness for this blade, which is defined as $\Delta t = t_{max} - t_{min}$, satisfies the following relationship: $\Delta t < \Delta t_d + \Delta h_d \tan \theta$, where $t_{min}$ = the minimum thickness of the blade as measured, $t_{max}$ = the maximum thickness of the blade as measured.

I prefer for simplicity to determine $t$ from $$\bar{t} = 0.5(t_{min} + t_{max}).$$

Note that more complicated methods are avialable for determining the average thickness.

The allowable plus or minus deviation of the blade height as ground for the blade 12 is calculated from $$\Delta h = \tfrac{1}{2}(\Delta h_d + \Delta t_d \cot \theta - \Delta t \cot \theta )$$

where $\Delta h$ is the allowable plus or minus deivation in the blade height from the height h for the blade.

As an example in the use of these equations in my invention, a customer would specify the following information on the type of blades he is using:

$t_d = 0.040"$, the minimum predetermined blade thickness, $t_d + \Delta t_d = 0.042"$, the maximum predetermined blade thickness, $h_d = 0.8745"$, the minimum predetermined blade height, $h_d + \Delta h_d = 0.8755"$, the maximum predetermined blade height, $\theta = 45°$, the blade angle.

To satisfy this customer's requirement, I would pick a blade whose thickness is close to that required by the customer. As an example, on the blade I chose, I would measure the following:

$t_{max} = 0.0398"$ $t_{min} = 0.0390"$

Using these values in the above equations, I calculate $$h = 0.8766",$$

which is the height to which I grind the blade. The allowable plus or minus deviation of this height from the value of 0.8756" is calculated to be $\Delta h = 0.0011"$ which $\Delta h$ is the plus or minus variation I allow for the blade I am manufacturing.

After the height is ground, the notches 26 can be formed. The method of the invention can also be employed to make perforating blades having a radius as shown in U.S. Pat. No. 3,190,163. the height h to which the blade will be ground is the height of the blade at the ends of the blade, for instance, at 21 in FIG. 7. After the blade is ground to height H, and the notches formed, the radius is machined.

In FIG. 5 is illustrated one perforating blade recess with three different blades 51, 52, 53 schematically mounted in it. These blades all have the same radial projection distance $R_p$ from the knife roll center KC, yet none of them have the same thickness or height.

However, all of the blades have the same sum of their thickness and height. Mathematically this would be expressed as:

$$h_1 + t_1 = h_2 + t_2 = h_3 + t_3 = \text{constant} \tag{1}$$

The above relationship is mathematically quite simple where the angle $\phi$ in FIGS. 5 and 6 is 45°, as is common in the industry. If this angle were something other than 45°, the height and thickness of any two perforating blades would have to solve the following equation:

$$h_1 \cos\phi + t_1 \sin\phi = h_2 \cos\phi + t_2 \sin\phi = \text{constant} \tag{2}$$

The equations 1 are 2 are derived from the previous equation $h = (h_d = \Delta h_d/2) + (t_d + \Delta t_d/2) - \bar{t} \cot\theta$ as follows:

Place the last term on the right into the left side to obtain $h + t \cot\theta = (h_d - \Delta h_d/2) + (t_d + \Delta t_d/2)$.

Everything on the right side of the equation just above is predetermined, not variable, and therefore a constant.

Define this constant to be $C_1$. The above equation now becomes $$h + \bar{t} \cot\theta = C_1$$

However, $\cot\theta = \cos\theta/\sin\theta$. Substituting this in the above equation, and multiplying through by $\sin\theta$ we arrive at $$h \sin\theta + \bar{t} \cos\theta = C_1 \sin\theta$$

Since $\theta$ is the same for all blades in a knife roll, $C_1 \sin\theta$ is simply a new constant which we will denote by C. We have therefore $$h \sin\theta + \bar{t} \cos\theta = C$$

Since $\theta = 90° - \phi$ $$\sin\theta = \sin(90° - \phi) = \cos\phi$$

and $$\cos\theta = \cos(90° - \phi) = \sin\phi$$

we have $$h \cos\phi + \bar{t} \sin\phi = C$$

This equation sets forth that the blade height and thickness for any blade in the knife roll must satisfy the above relationship. If we denote the first blade by subscript 1, the second by subscript 2, and so on, we have $$h_1 \sin\phi + \bar{t}_1 \cos\phi = h_2 \sin\phi + \bar{t}_2 \cos\phi = C$$

In the above equation, if $\phi$ is set equal to 45°, we can then divide out the sin 45° and cos 45° term, since they are equal to each other. We then get for the case of $\phi$ = 45°, $h_1 + t_1 = h_2 + t_2 = C_2$, where $C_2$ is another constant.

The realtionship of $h_1 + t_1 = h_2 + t_2 = C_2$ is useful because now steel can be purchased for perforating blades in a thickness nominally equal to that specified by the operator of this apparatus. Furthermore, if the steel is scale free, as cold-rolled high speed steel is, it can be hardened in a vacuum furnace without any surface preparation. Likewise, the hardening operation produces no scale on the surface of the perforating blade. Therefore, the steel can be purchased in the nominal gauge needed by the finished product, and furthermore, no surface finishing need be performed on these blades.

However, the thickness of the steel as obtained from the steel producer is not identically the same from piece to piece. But by using the fact that the sum of the height and thickness is a constant, I am able to adjust the height to compensate for the variation in thickness in such a manner as to keep the projection distance constant for all blades mounted in a knife roll.

Although the thickness of blades in a prior art knife roll will vary within a tolerance range of ± 0.00025 to ± 0.001 inches, blades produced in accordance with the method of the invention can be used in the same knife roll even though the thickness variation between individual blades exceeds 0.002 inches as long as the projection distance is equal.

I claim:

1. In a knife roll for use in web perforating apparatus, said knife roll including at least two recesses for mounting perforating blades around its periphery, said recesses having surfaces for mounting perforating blades at a common angle greater than 0° but less than 90° with a radial line, and wherein said recesses are formed from intersecting surfaces on the knife roll with the intersections of said recesses being at a common distance from the axis of said roll, the improvement comprising a plurality of perforating blades loaded in said knife roll recesses, at least one of said blades having a different thickness than the remainder of said blades and in which all blades project from said knife roll face a common distance.

2. The improvement of claim 1 wherein the sides of said blades are in the as-rolled and hardened condition.

3. A knife roll in accordance with claim 1 wherein said one blade having a different thickness than the remainder of the blades has a thickness difference from at least one of said remainder of blades in excess of 0.002 inches.

4. A knife roll for web perforating apparatus including a plurality of perforating blades pojecting at an angle of 45° with respect to a radial line through the axis of said knife roll and in which the thickness and height of each of said blades varies but in which the sum of the thickness and height for each blade is substantially equal, thereby causing each of said blades to project a common distance from siad knife roll.

* * * * *